United States Patent
Yang et al.

(10) Patent No.: US 12,096,480 B2
(45) Date of Patent: Sep. 17, 2024

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Joonkui Ahn, Seoul (KR); Seokmin Shin, Seoul (KR); Sechang Myung, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 17/910,264

(22) PCT Filed: Aug. 6, 2021

(86) PCT No.: PCT/KR2021/010437
§ 371 (c)(1),
(2) Date: Sep. 8, 2022

(87) PCT Pub. No.: WO2022/031123
PCT Pub. Date: Feb. 10, 2022

(65) Prior Publication Data
US 2023/0108745 A1    Apr. 6, 2023

Related U.S. Application Data

(60) Provisional application No. 63/062,403, filed on Aug. 6, 2020.

(30) Foreign Application Priority Data

Apr. 5, 2021    (KR) ........................ 10-2021-0044266

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/006* (2013.01)

(58) Field of Classification Search
CPC ............ H04W 74/0833; H04W 74/006; H04L 27/26; H04L 5/00
See application file for complete search history.

(56) References Cited

U.S. PATENT DOCUMENTS

| 2019/0306832 A1 | 10/2019 | Si et al. |
| 2020/0008240 A1 | 1/2020 | Elbwart |

(Continued)

FOREIGN PATENT DOCUMENTS

| CA | 3060828 | 5/2020 |
| KR | 20190029397 | 3/2019 |

(Continued)

OTHER PUBLICATIONS

International Search Report in International Appln. No. PCT/KR2021/010437, Dec. 1, 2021, 5 pages (with English translation).

(Continued)

*Primary Examiner* — Brian D Nguyen
(74) *Attorney, Agent, or Firm* — Fish & Richardson P.C.

(57) ABSTRACT

The present disclosure relates to a wireless communication system. Specifically, the present disclosure relates to a method and an apparatus therefor, the method comprising the steps of: transmitting an RA preamble on one RO among a plurality of ROs, wherein a resource to which the RA preamble is transmitted includes the following elements, (a) a sub-interval index within a 10 ms interval, (b) a slot index within a sub-interval, (c) a symbol index within a slot, and (d) a frequency resource index; and after transmitting the RA preamble, monitoring DCI having an RA-identifier within a time window, the RA-identifier being masked in a CRC in the DCI, and receiving an RA response correspond- (Continued)

ing to the DCI, wherein one of (a) to (d) is included in a payload in the DCI, and the rest of (a) to (d) is included in the RA-identifier.

10 Claims, 13 Drawing Sheets

(56) References Cited

U.S. PATENT DOCUMENTS

| | | | |
|---|---|---|---|
| 2020/0146054 A1 | 5/2020 | Jeon et al. | |
| 2020/0267764 A1* | 8/2020 | Rastegardoost | H04W 76/27 |
| 2020/0314664 A1* | 10/2020 | Zhou | H04L 25/0226 |
| 2020/0314913 A1* | 10/2020 | Rastegardoost | H04L 5/0091 |
| 2021/0176095 A1 | 6/2021 | Manolakos et al. | |
| 2022/0053442 A1 | 2/2022 | Luo et al. | |
| 2022/0330211 A1 | 10/2022 | Awad et al. | |
| 2022/0369378 A1 | 11/2022 | Awad et al. | |
| 2022/0377812 A1* | 11/2022 | Jung | H04L 5/0053 |
| 2023/0029520 A1 | 2/2023 | Lin et al. | |
| 2023/0077603 A1 | 3/2023 | Qiu et al. | |
| 2023/0354411 A1* | 11/2023 | Zhang | H04W 72/0446 |
| 2024/0049292 A1* | 2/2024 | Liu | H04L 1/1893 |

FOREIGN PATENT DOCUMENTS

| | | |
|---|---|---|
| KR | 20190138675 | 12/2019 |
| KR | 20200010611 | 1/2020 |
| KR | 10-2021-0108858 | 9/2021 |
| WO | WO 2020/126892 | 6/2020 |
| WO | WO 2020/151754 | 7/2020 |
| WO | WO2020146631 | 7/2020 |

OTHER PUBLICATIONS

Office Action in U.S. Appl. No. 18/151,189, mailed on Apr. 21, 2023, 6 pages.
Convida Wireless, "Summary of Remaining details on PRACH formats," 3GPP TSG RAN WG1 Meeting #93, R1-1807686, Busan, Korea, May 21-25, 2018, 40 pages.
ETSI TS 138 321 V16.1.0 (Jul. 2020), 5G NR Medium Access Control (MAC) protocol specification (3GPP TS 38.321 version 16.1.0 Release 16), Jul. 2020, 153 pages.
LG Electronics, "Remaining issues of initial access and mobility for NR-U," 3GPP TSG RAN WG1 #101, R1-2004014, e-Meeting, May 25-Jun. 5, 2020, 13 pages.
Notice of Allowance in Japanese Appln. No. 2022-567794, mailed on Oct. 17, 2023, 4 pages (with English translation).
Notice of Allowance in Korean Appln. No. 10-2022-7029250, mailed on Dec. 5, 2023, 2 pages (with English translation).
ZTE Corporation, Sanechips, "Consideration on the MsgB RA-RNTI calculation," 3GPP TSG-RAN2 Meeting #108, R2-1914797, Reno, USA, Nov. 18-22, 2019, 2 pages.

* cited by examiner

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/010437, filed on Aug. 6, 2021, which claims the benefit of Korean Application No. 10-2021-0044266, filed on Apr. 5, 2021, and U.S. Provisional Application No. 63/062,403, filed on Aug. 6, 2020. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Task

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In a first technical aspect of the present disclosure, provided is a method of performing a Random Access (RA) by a user equipment in a wireless communication system, the method including transmitting an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, monitoring Downlink Control Information (DCI) having an RA-identifier within a time window after transmitting the RA preamble, the RA-identifier masked with a Cyclic Redundancy Check (CRC) within the DCI, and receiving an RA response corresponding to the DCI, wherein one of the (a) to (d) may be included in a payload within the DCI and wherein the rest of the (a) to (d) may be included in the RA-identifier.

In a second technical aspect of the present disclosure, provided is a user equipment used in a wireless communication system, the user equipment including at least one Radio Frequency (RF) unit, at least one processor, and at least one computer memory operably connected to the at least one processor and enabling the at least one processor to perform an operation when executed, the operation including transmitting an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, monitoring Downlink Control Information (DCI) having an RA-identifier within a time window after transmitting the RA preamble, the RA-identifier masked with a Cyclic Redundancy Check (CRC) within the DCI, and receiving an RA response corresponding to the DCI, wherein one of the (a) to (d) may be included in a payload within the DCI and wherein the rest of the (a) to (d) may be included in the RA-identifier.

In a third technical aspect of the present disclosure, provided is an apparatus for a user equipment, the apparatus including at least one processor and at least one computer memory operably connected to the at least one processor and enabling the at least one processor to perform an operation when executed, the operation including transmitting an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, monitoring Downlink Control Information (DCI) having an RA-identifier within a time window after transmitting the RA preamble, the RA-identifier masked with a Cyclic Redundancy Check (CRC) within the DCI, and receiving an RA response corresponding to the DCI, wherein one of the (a) to (d) may be included in a payload within the DCI and wherein the rest of the (a) to (d) may be included in the RA-identifier.

In a fourth technical aspect of the present disclosure, provided is a computer-readable storage medium, comprising at least one computer program enabling at least one processor to perform an operation when executed, the operation including transmitting an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, monitoring Downlink Control Information (DCI) having an RA-identifier within a time window after transmitting the RA preamble, the RA-identifier masked with a Cyclic Redundancy Check (CRC) within the DCI, and receiving an RA response corresponding to the DCI, wherein one of the (a) to (d) may be included in a payload within the DCI and wherein the rest of the (a) to (d) may be included in the RA-identifier.

In a fifth technical aspect of the present disclosure, provided is a method of performing a Random Access (RA) by a base station in a wireless communication system, the method including receiving an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, transmitting Downlink Control Information (DCI) having an RA-identifier within a time window after receiving the RA preamble, the RA-identifier masked with a Cyclic Redundancy Check (CRC) within the DCI, and transmitting an RA response corresponding to the DCI, wherein one of the (a) to (d) may be included in a payload within the DCI and wherein the rest of the (a) to (d) may be included in the RA-identifier.

In a sixth technical aspect of the present disclosure, provided is a base station used in a wireless communication system, the base station including at least one Radio Frequency (RF) unit, at least one processor, and at least one computer memory operably connected to the at least one processor and enabling the at least one processor to perform an operation when executed, the operation including receiving an RA preamble on one of multiple RA Occasions (ROs), the RA preamble transmitted on a resource, the resource including the following elements: (a) a sub-period index within a 10-ms period; (b) a slot index within a sub-period; (c) a symbol index within a slot; and (d) a frequency resource index, transmitting Downlink Control Information (DCI) having an RA-identifier within a time window after receiving the RA preamble, the RA-identifier masked with a Cyclic Redundancy Check (CRC) within the DCI, and transmitting an RA response corresponding to the DCI, wherein one of the (a) to (d) may be included in a payload within the DCI and wherein the rest of the (a) to (d) may be included in the RA-identifier.

Preferably, the (a) may be included in the payload within the DCI and the (b) to (d) may be included in the RA-identifier.

Preferably, a size of a field having the (a) included therein in the payload within the DCI may be proportional to a Subcarrier Spacing (SCS) configured in the RA preamble or an SCS of a carrier having the RA preamble transmitted thereon.

Preferably, a size of a field having the (a) included therein in the payload within the DCI may be determined based on (i) a Subcarrier Spacing (SCS) configured in the RA preamble or an SCS of a carrier having the RA preamble transmitted thereon and a type of an RA procedure supported by the user equipment.

Preferably, the RA-identifier is defined by a following formula:

$$1+s+\{14*t\}+\{14*80*f\}+\{14*80*8*u\}+14*80*8*r,$$

where the s is a symbol index and has a value of 0~13,
the t is a slot index and has a value of 0~79,
the f is a frequency resource index and has a value of 0~7,
the u is 0 or 1 as a value related to a carrier having the RA preamble transmitted thereon, and
the r is 0 or 2 as a value for a type of an RA procedure.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
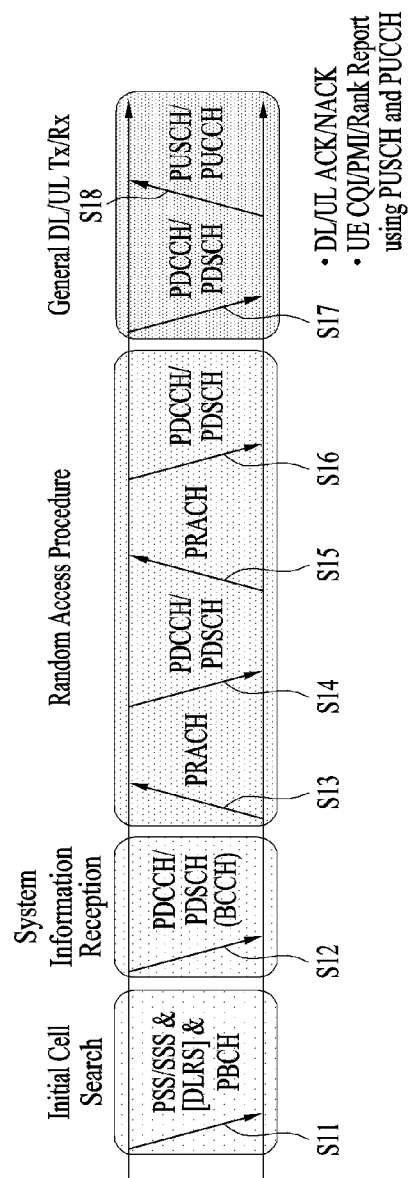
FIG. 1 illustrates physical channels used in a 3rd generation partnership project (3GPP) system as an exemplary wireless communication system, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
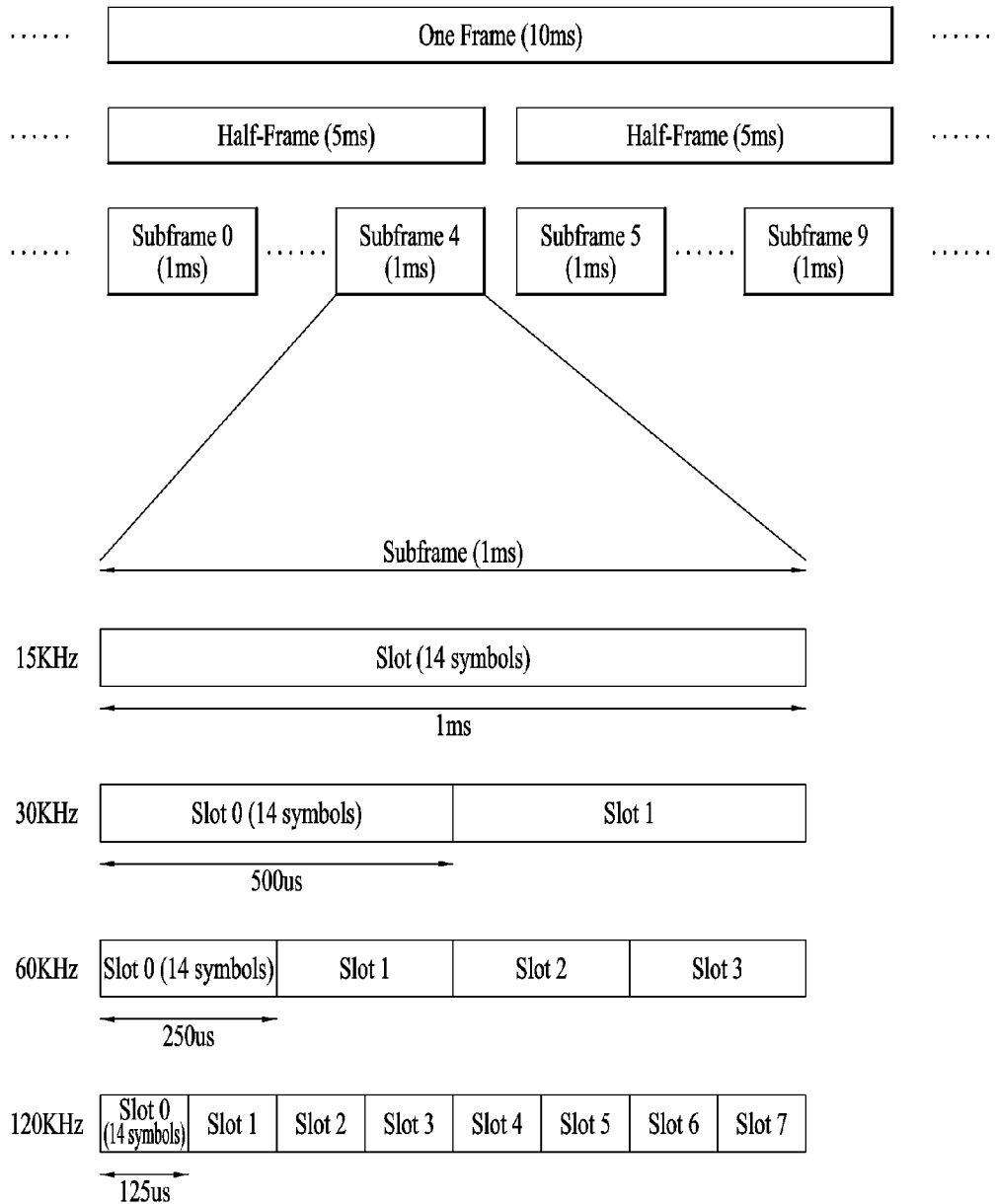
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N_{symb}^{slot}$: Number of symbols in a slot
$N_{slot}^{frame,u}$: Number of symbols in a frame
$N_{slot}^{subframe,u}$: Number of symbols in a subframe Table 2 illustrates that the number of symbols per slot, the number of slots per frame, and the number of slots per subframe vary according to the SCS when the extended CP is used.

TABLE 2

| SCS ($15*2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
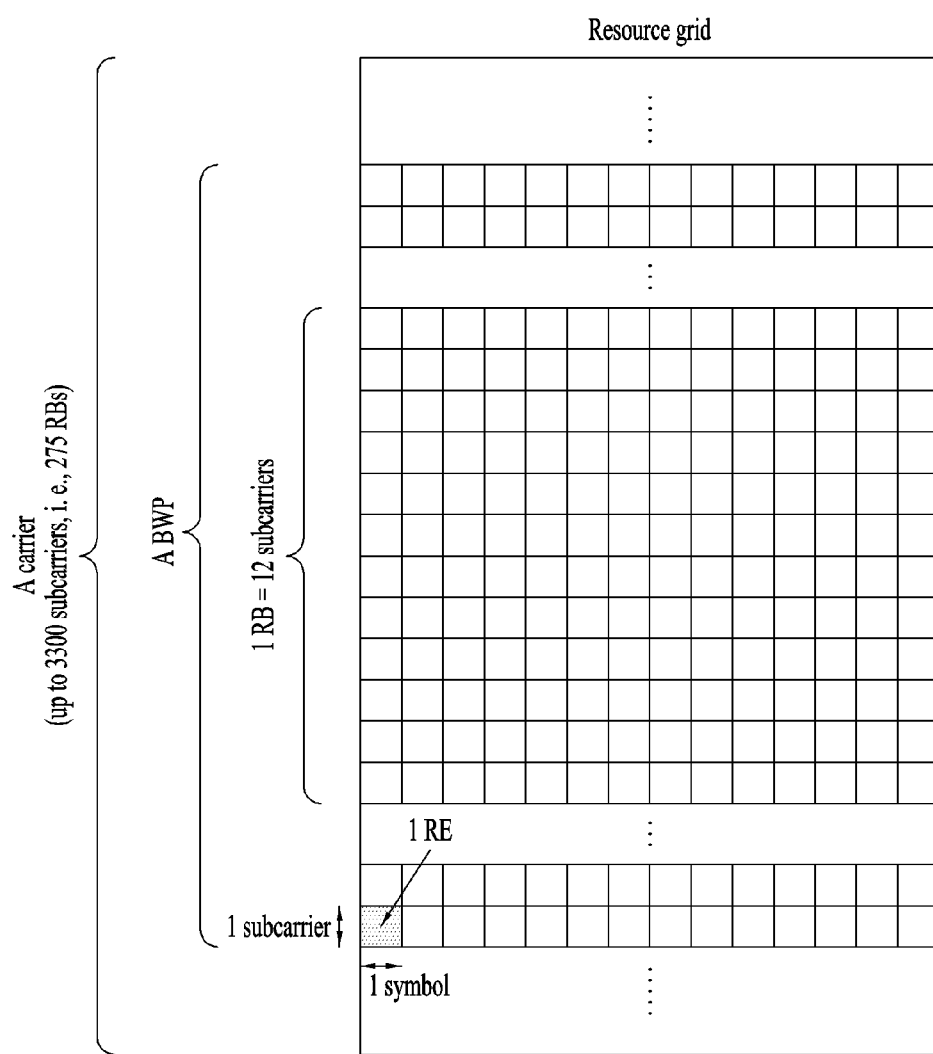
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
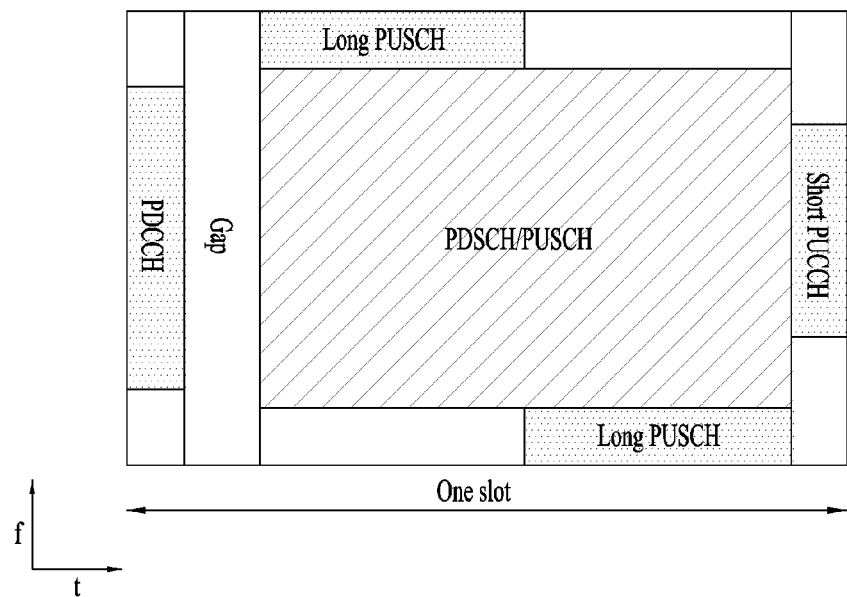
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

Hereinafter, each physical channel will be described in detail.

PDCCH carries Downlink Control Information (DCI). For example, PDCCH (i.e., DCI) carries transmission format and resource allocation of Downlink-Shared Channel (DL-SCH), resource allocation information on Uplink-Shared Channel (UL-SCH), paging information on Paging Channel (PCH), system information on DL-SCH, resource allocation information on a higher layer control message such as a random access response transmitted on PDSCH, transmit power control command, activation/release of Configured Scheduling (CS) and the like. DCI includes a Cyclic Redundancy Check (CRC), and the CRC is masked/scrambled with various identifiers (e.g., Radio Network Temporary Identifier (RNTI)) according to an owner or usage of PDCCH. For example, when PDCCH is provided for a specific UE, CRC is masked with a UE identifier (e.g., Cell-RNTI (C-RNTI)). When PDCCH relates to paging, CRC is masked with Paging-RNTI (P-RNTI). When PDCCH relates to system information (e.g., System Information Block (SIB)), CRC is masked with System Information-RNTI (SI-RNTI). When PDCCH relates to a random access response, CRC is masked with Random Access-RNTI (RA-RNTI).

PDCCH is configured with 1, 2, 4, 8, or 16 Control Channel Elements (CCEs) depending on an Aggregation Level (AL). CCE is a logical allocation unit used to provide PDCCH of a prescribed coding rate according to a radio channel state. CCE is configured with 6 Resource Element Groups (REGs). REG is defined as a single PFDM symbol and a single (P)RB. PDCCH is transmitted through a Control Resource Set (CORESET). CORESET is defined as an REG set having a given numerology (e.g., SCS, CP length, etc.). A plurality of CORESETs for a single UE may overlap in time/frequency domain. CORESET may be configured through system information (e.g., Master Information Block (MIB)) or UE-specific higher layer (e.g., Radio Resource Control (RRC) layer) signaling. Specifically, the number of RBs and the number of OFDM symbols (maximum 3) configuring CORESET may be set by higher layer signaling.

For PDCCH reception/detection, a UE monitors PDCCH candidates. A PDCCH candidate represents CCE(s) a UE should monitor for PDCCH detection. Each PDCCH candidate is defined as 1, 2, 4, 8, or 16 CCEs depending on AL. Monitoring includes (blinding) decoding PDCCH candidates. A set of PDCCH candidates monitored by a UE is defined as a PDCCH Search Space (SS). A search space includes a Common Search Space (CSS) or a UE-specific Search Space (USS). A UE may obtain DCI by monitoring a PDCCH candidate in one or more search spaces configured by MIB or higher layer signaling. Each CORESET is associated with one or more search spaces, and each search space is associated with a single CORESET. A search space may be defined based on the following parameters.

controlResourceSetId: This indicates CORESET related to a search space.

monitoringSlotPeriodicityAndOffset: This indicates PDCCH monitoring periodicity (slot unit) and PDCCH monitoring period offset (slot unit).

monitoringSymbolsWithinSlot: This indicates PDCCH monitoring symbols within a slot (e.g., first symbol(s) of CORESET).

nrofCandidates: This indicates the number ((0, 1, 2, 3, 4, 5, 6, or 8) of PDCCH candidates per AL={1, 2, 4, 8, 16}.

An occasion (e.g., Time/frequency resource) on which PDCCH candidates should be monitored is defined as a PDCCH (monitoring) occasion.

Table 3 illustrates features per search space type.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 illustrates DCI formats transmitted on PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 4-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, and DCI format 0_1 may be used to schedule TB-based (or TB-level) PUSCH or Code Block Group-based (CBG-based) (or CBG-level) PUSCH. DCI format 1_0 may be used to schedule TB-based (or TB-level) PDSCH, and DCI format 1_1 may be used to schedule TB-based (or TB-level) PDSCH or CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to transmit dynamic slot format information (e.g., dynamic SFI) to a UE, and DCI format 2_1 may be used to transmit downlink pre-emption information to the UE. DCI format 2_0 and/or DCI format 2_1 may be transmitted to UEs in a corresponding group through a group common PDCCH, which is a PDCCH that is transmitted to UEs defined as one group. DCI format 0_0 and DCI format 1_0 may be referred to as fallback DCI format, and DCI format 0_1 and DCI format 1_1 may be referred to as non-fallback DCI format. The fallback DCI format maintains the same DCI size/field configuration irrespective of UE configuration. On the other hand, in the non-fallback DCI format, the DCI size/field configuration varies according to UE settings.

PDSCH carries downlink data (e.g., DL-SCH Transport Block (DL-SCHTB)), and modulation methods such as Quadrature Phase Shift Keying (QPSK), 16 Quadrature Amplitude Modulation (QAM), 64 QAM, 256 QAM and the like are applied. A codeword is generated by encoding a TB. The PDSCH may carry up to two codewords. Scrambling and modulation mapping are performed for each codeword, and modulation symbols generated from each codeword may be mapped into one or more layers. Each layer is mapped to a resource together with a Demodulation Reference Signal (DMRS), generated as an OFDM symbol signal, and transmitted through a corresponding antenna port.

PUCCH carries Uplink Control Information (UCI). The UCI includes the following.

Scheduling Request (SR): Information used to request a UL-SCH resource.

Hybrid Automatic Repeat request-Acknowledgement (HARQ-ACK): This is a response to a downlink data packet (e.g., codeword) on PDSCH and indicates whether the downlink data packet has been successfully received. 1-bit HARQ-ACK may be transmitted in response to a single codeword, and 2-bit HARQ-ACK may be transmitted in response to two codewords. The HARQ-ACK response includes a positive ACK (simply, ACK), a negative ACK (NACK), or a DTX or NACK/DTX. Here, HARQ-ACK is used with HARQ ACK/NACK or ACK/NACK.

Channel State Information (CSI): Feedback information on a downlink channel. Multiple Input Multiple Output-related (MIMO-related) feedback information includes a Rank Indicator (RI) and a Precoding Matrix Indicator (PMI).

Table 5 illustrates PUCCH formats. Short PUCCH (formats 0 and 2) and Long PUCCH (formats 1, 3, and 4) may be classified according to PUCCH transmission lengths.

TABLE 5

| PUCCH format | Length in OFDM symbols $N_{symb}^{PUCCH}$ | Number of bits | Usage | Etc |
|---|---|---|---|---|
| 0 | 1 -2 | ≤2 | HARQ, SR | Sequence selection |
| 1 | 4 - 14 | ≤2 | HARQ, [SR] | Sequence modulation |
| 2 | 1 -2 | >2 | HARQ, CSI, [SR] | CP-OFDM |
| 3 | 4 - 14 | >2 | HARQ, CSI, [SR] | DFT-s-OFDM (no UE multiplexing) |
| 4 | 4 - 14 | >2 | HARQ, CSI, [SR] | DFT-s-OFDM (Pre DFT OCC) |

PUCCH format 0 carries UCI with a maximum size of 2 bits, and is mapped and transmitted based on a sequence. Specifically, a UE transmits one of a plurality of sequences through PUCCH which is a PUCCH format 0 to transmit a specific UCI to a BS. The UE transmits PUCCH, which is PUCCH format 0, in a PUCCH resource for a corresponding SR configuration only when transmitting a positive SR.

PUCCH format 1 carries a UCI of up to 2 bits in size, and a modulation symbol is spread in a time domain by an Orthogonal Cover Code (OCC) (configured differently depending on frequency hopping). DMRS is transmitted in a symbol where the modulation symbol is not transmitted (i.e., transmitted over Time Division Multiplexing (TDM)).

PUCCH format 2 carries a UCI of a bit size greater than 2 bits, and a modulation symbol is transmitted by being FDMed (frequency division multiplexed) with DMRS. DM-RS is located at symbol indexes #1, #4, #7, and #10 in a resource block given with a density of 1/3. A Pseudo Noise (PN) sequence is used for a DM_RS sequence. Frequency hopping may be activated for a two-symbol PUCCH format 2.

PUCCH format 3 does not perform UE-multiplexing within the same physical resource blocks and carries a UCI having a bit size greater than 2 bits. In other words, a PUCCH resource of PUCCH format 3 does not include an orthogonal cover code. A modulation symbol is transmitted by being TDMed (time division multiplexed) with a DMRS.

PUCCH format 4 supports multiplexing of up to four UEs within the same physical resource blocks, and carries a UCI with a bit size greater than 2 bits. In other words, a PUCCH resource of PUCCH format 3 includes an orthogonal cover code. A modulation symbol is transmitted by being TDMed (time division multiplexed) with a DMRS.

PUSCH carries uplink data (e.g., UL-SCH Transport Block (UL-SCHTB)) and/or uplink control information (UCI), and is transmitted based on a Cyclic Prefix-Orthogonal Frequency Division Multiplexing (CP-OFDM) waveform or Discrete Fourier Transform-spread-Orthogonal Frequency Division Multiplexing (DFT-s-OFDM) waveform. When PUSCH is transmitted based on DFT-s-OFDM waveform, a UE transmits the PUSCH by applying transform precoding. For example, if transform coding is impossible (e.g., transform precoding is disabled), a UE may transmit PUSCH based on CP-OFDM waveform. If transform coding is possible (e.g., transform precoding is enabled), a UE may transmit PUSCH based on CP-OFDM waveform or DFT-s-OFDM waveform. PUSCH transmission may be dynamically scheduled by UL grant in DCI or semi-statically scheduled based on higher layer (e.g., RRC) signaling (and/or Layer 1 (L1) signaling (e.g., PDCCH)) (configured grant). PUSCH transmission may be performed based on a codebook or a non-codebook.

Figure 5:
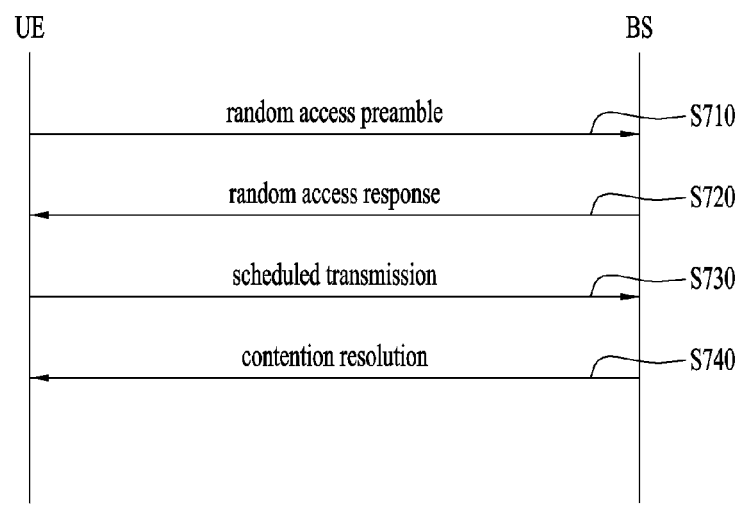
FIG. 5 illustrates a 4-step Random Access Channel (RACH) process.

FIG. 5 illustrates a 4-step RACH process. Referring to FIG. 5, a signal/information transmitted through each step and a detailed operation performed in each step are as follows.

1) Msg1 (PRACH): This is transmitted from a UE to a BS (S710). Each Msg1 may be divided into a time/frequency resource (RACH Occasion (RO)), on which a Random Access (RA) preamble is transmitted, and a preamble index (RA Preamble Index (RAPID)).

2) Msg2 (RAR PDSCH): This is a response message to the Msg1 and is transmitted from the BS to the UE (S720). For Msg2 reception, the UE may perform PDCCH monitoring to check whether there is RA-RNTI-based PDCCH (e.g., CRC of PDCCH is masked with RA-RNTI) within a time window (hereinafter, RAR window) related to the Msg1. When the PDCCH masked with the RA-RNTI is received, the UE may receive an RAR from PDSCH indicated by the RA-RNTI PDCCH. The RA-RNTI may be determined as follows.

3) Msg3 (PUSCH): This is transmitted from the UE to the BS (S730). Msg3 is performed based on the UL grant in the RAR. The Msg3 may include a contention resolution Identity (ID) (and/or Buffer Status Report (BSR) information, RRC connection request, etc.). Retransmission according to an HARQ process may be applied to the Msg3 (PUSCH). Here, the contention resolution ID includes a UL Common Control Channel (UL CCCCH) Service Data Unit (SDU). When the UL CCCH SDU is greater than 48 bits, only the first 48 bits of the UL CCCH SDU may be included in the Msg3.

4) Msg4 (PDSCH): This is transmitted from the BS top the UE (S740). Msg4 may include a UE (global) ID (and/or RRC connection-related information) for contention resolution. Success or failure in contention resolution may be determined based on the Msg4.

If the Msg2/Msg4 is not successfully received, the UE retransmits the Msg1. In doing so, the UE increases the transmission power of the Msg1 (power ramping), and increases an RACH retransmission counter value. When the RACH retransmission counter value reaches the maximum value, it is determined that the RACH process has completely failed. In this case, after performing a random back-off, the UE may initialize an RACH-related parameter (e.g., an RACH retransmission counter) to newly start the RACH process.

Figure 6:
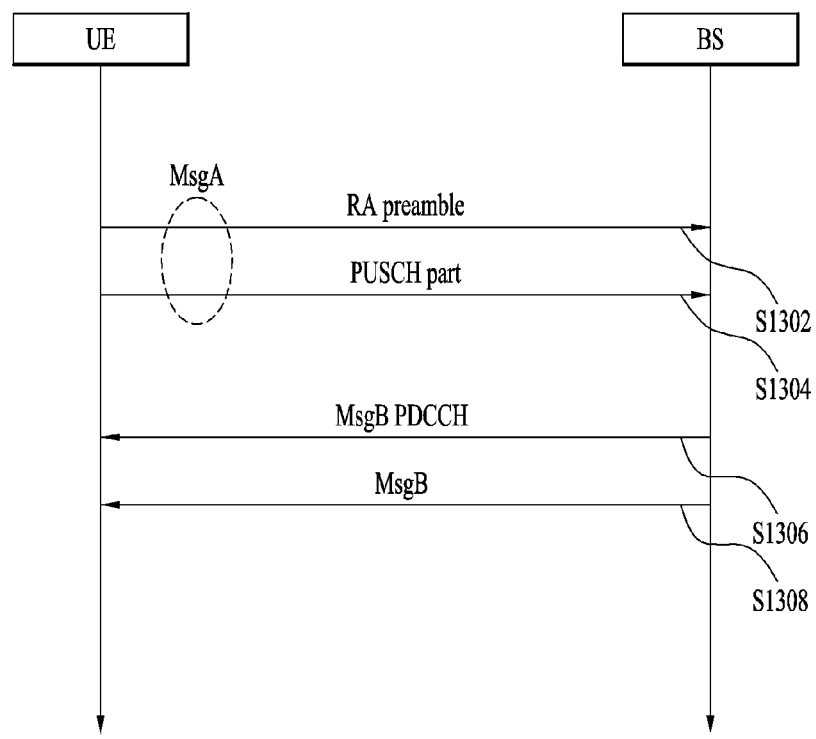
FIG. 6 illustrates a 2-step RACH process.

FIG. 6 illustrates a 2-step RACH process. Referring to FIG. 6, a UE may transmit a random access request message (e.g., MsgA) to a BS. The MsgA transmission includes a Random Access Preamble (RAP) transmission (S1302) and a PUSCH transmission (S1304). Thereafter, in order to receive a response (i.e., MsgB) to the MsgA, the UE may monitor a PDCCH within a time window related to RAP. Specifically, in order to receive the MsgB, the UE may receive a PDCCH (hereinafter, referred to as a MsgB PDCCH) for scheduling the MsgB in the time window (S1306), and may receive the MsgB based on it (S1308). To receive the MsgB PDCCH, the UE may monitor a specific RNTI-based PDCCH (e.g., a CRC of the PDCCH is masked with a specific-RNTI). Here, the PDCCH monitoring includes performing blind decoding on a PDCCH candidate. In addition, the specific RNTI may include an RA-RNTI. If the MsgB is not successfully received or/and fails in contention resolution, the UE may perform MsgA retransmission. Meanwhile, when the MsgB is received and contention resolution is successful, the RACH process is successfully completed. When the MsgB includes PUCCH resource allocation information for HARQ-ACK feedback transmission, the UE may transmit HARQ-ACK feedback on the MsgB reception using an allocated PUCCH resource. In addition, when the MsgB includes a TA command and PUSCH resource allocation information (e.g., UL grant), the UE may transmit a PUSCH based on the TA command and the PUSCH resource allocation information.

Embodiment: RACH Process

Figure 7:
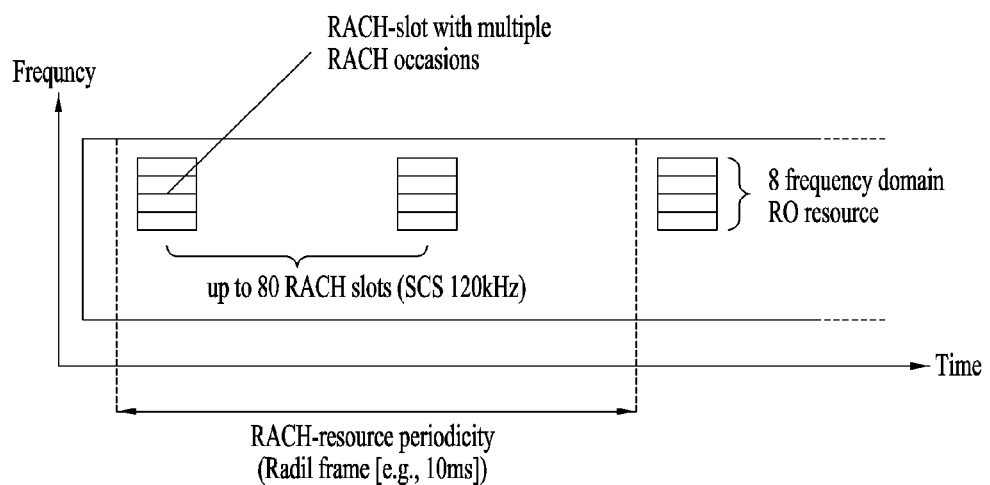
FIG. 7 illustrates a RACH Occasion (RO)

FIG. 7 illustrates multiple ROs configured in an RACH resource duration. An RA-RNTI applied to a PDCCH that schedules an RAR in the existing 4-step RACH of 3GPP Rel-15/16 and a MsgB-RNTI applied to a PDCCH that schedules a MsgB in 2-step RACH thereof may be calculated/determined as a function of the following parameters to distinguish multiple ROs configured within a 10-ms period.

$$\text{RA-RNTI}=1+s+\{14*t\}+\{14*80*f\}+\{14*80*8*u\} \quad \text{[Equation 1]}$$

$$\text{MsgB-RNTI}=1+s+\{14*t\}+\{14*80*f\}+\{14*80*8*u\}+14*80*8*2, \text{ where,}$$

RNTI is configured with 16 bits and has values ranging 0 to 65535,
a first OFDM symbol index (s) of PRACH is $0 \le s < 14$,
a first slot index (t) of PRACH in a radio frame is $0 \le t < 80$ (where t corresponds to a value in consideration of up to 120 KHz that is a maximum SCS value),
a frequency domain RO index (f) is $0 \le f < 8$, and
a UL carrier type/index (u) used for PRACH transmission is $0 \le u < 2$ (e.g., 0 for Normal Uplink (NUL) carrier, 1 for Supplementary Uplink (SUL) carrier).

RA-RNTI/MsgB-RNTI of Equation 1 may be generalized as follows. Definitions of parameters of Equation 2 may refer to Equation 1.

$$1+s+\{14*t\}+\{14*80*f\}+\{14*80*8*u\}+14*80*8*r, \text{ where,} \quad \text{[Equation 2]}$$

s is a symbol index and has a value ranging 0 to 13,
t is a slot index and has a value ranging 0 to 79,
f is a frequency resource index and has a value ranging 0 to 7,
u is a value related to a carrier of the RA preamble and has a value of 0 or 1, and
r may have 0 or 2 as a value for an RACH type. For example, when PRACH is transmitted through the 4-step RACH, r may be set to 0. On the other hand, when PRACH is transmitted through the 2-step RACH, r may be set to 2.

Meanwhile, in 3GPP Rel-17, the introduction of SCSs (e.g., 240 KHz, 480 KHz, and 960 KHz) larger than 120

KHz may be considered for the purpose of designing NR systems operating in higher frequency bands than before. In this case, the number of slots (indexes) in the 10-ms period may increase in proportion to the size of the SCS.

For example, when a PRACH SRS is 480 KHz or 960 KHz, the number of slots (indexes) in the 10-ms period becomes 320 or 640, respectively. Here, the PRACH SCS refers to an SCS configured in a PRACH (or an RA preamble) or an SCS of a band/carrier/cell in which the corresponding PRACH (or RA preamble) transmission is performed. In this case, when calculated by the existing formula (see Equation 1), a maximum value of RA-RNTI becomes approximately 71680 or 143360, respectively, and a maximum value of MsgB-RNTI becomes approximately 143360 or 286720, respectively. For this reason, there occurs a problem in deviating from the range (0 to 65535) of values that the 16-bit RNTI may have.

Hereinafter, in order to solve the above-described RA-RNTI and MsgB-RNTI problems, the following method is proposed. The proposed method of the present specification may be limited to systems supporting larger (PRACH) SCSs (e.g., 240 KHz, 480 KHz, and 960 KHz) than conventional 3GPP Rel-15/16. For example, when the (PRACH) SCS is 120 KHz or less, multiple ROs in RACH resource periodicity may be classified based on Equations 1 and 2. On the other hand, when the (PRACH) SCS is greater than 120 KHz, multiple ROs in the RACH resource periodicity may be classified by the proposed method of the present specification.

Hereinafter, unless specifically distinguished, RA-RNTI (or RA-identifier) includes RA-RNTI and MsgB-RNTI, and may be interpreted as RA-RNTI or MsgB-RNTI depending on the context.

[Proposed Method 1]

1) Method 1-1: With a 10-ms period divided into multiple (e.g., N) sub-periods, a DCI (field) that schedules an RAR (or MsgB) may indicate which sub-period an RO location belongs to (for convenience, define the corresponding DCI field as an SP field). In this case, the combination of a symbol index s, a slot index t, a frequency index f, and a carrier index u of an RO in a sub-period may be indicated through RA-RNTI (or MsgB-RNTI).

Figure 8:
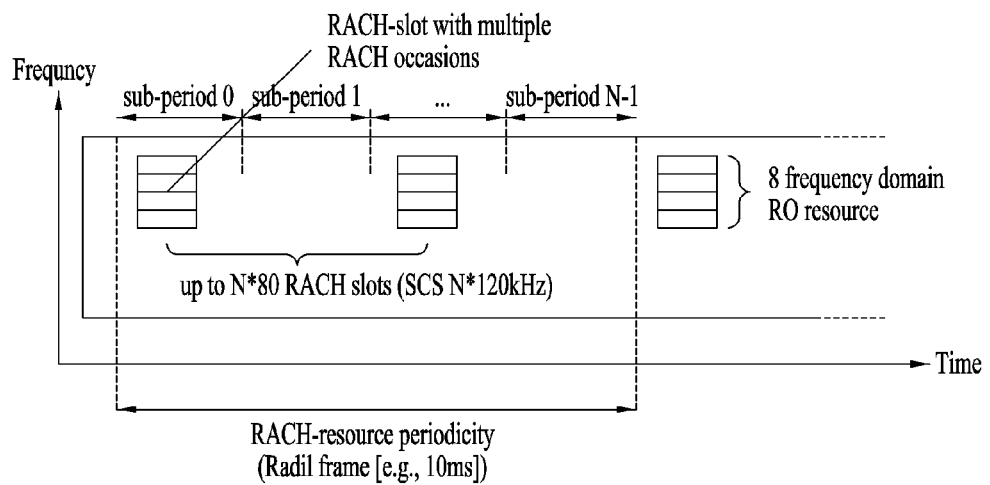
FIG. 8 and FIG. 8 illustrate RACH processes according to the present disclosure.

A. For example, referring to FIG. 8, when N=2 (e.g., SCS=2*120 KHz), sub-period indexes 0 and 1 may be set as a first 5-ms period and a second 5-ms period (within 10 ms), respectively. When N=4 (e.g., SCS=4*120 KHz), the sub-period indexes 0 to 3 may be set as first to fourth 2.5-ms periods (within 10 ms), respectively. In addition, when N=8, the sub-period indexes 0 to 7 may be set as first to eighth 1.25-ms periods (within 10 ms), respectively.

B. An N value (and a corresponding SP field size) may be set differently according to a size of a PRACH SCS. For example, when a PRACH SCS is 480 (=4*120) KHz, it may be set as N=4 and a size of an SP field may be 2 bits. For another example, when a PRACH SCS is 960 (=8*120) KHz, it may be set as N=8 and an SP field size may be 3 bits. In this example, an RA-RNTI may be configured based on Equations 1 and 2 in consideration of an RACH type.

C. An N value and a corresponding SP field size may be set differently depending on a presence or non-presence of 2-step RACH process support of a system. For example, in a situation that a PRACH SCS is 480 (=4*120) KHz, when a system supports 2-step RACH, it is set as N=4 and an SP field size becomes 2 bits. On the other hand, when there is no 2-step RACH support, it is set as N=2 and an SP field size may become 1 bit. For another example, in a situation that a PRACH SCS is 960 (=8*120) KHz, when 2-step RACH is supported, it is set as N=8 and an SP field size becomes 3 bits. On the other hand, when there is no 2-step RACH support, it is set as N=4 and an SP field size may become 2 bits. In the present example, an RA-RNTI may be configured based on the RA-RNTI formula of Equation 1 irrespective of an RACH type.

2) Method 1-2: While a set of eight frequency indexes f is divided into multiple (e.g., M) subsets, a DCI (field) that schedules an RAR (or MsgB) may indicate which subset a location of an RO belongs to (for convenience, define the corresponding DCI field as an SF field). In this case, the combination of an RO symbol index s, a slot index t, a frequency index f, and a carrier index u in the subset may be indicated through an RA-RNTI (or MsgB-RNTI). M may be a value obtained by dividing a PRACH SCS by 120.

Figure 9:
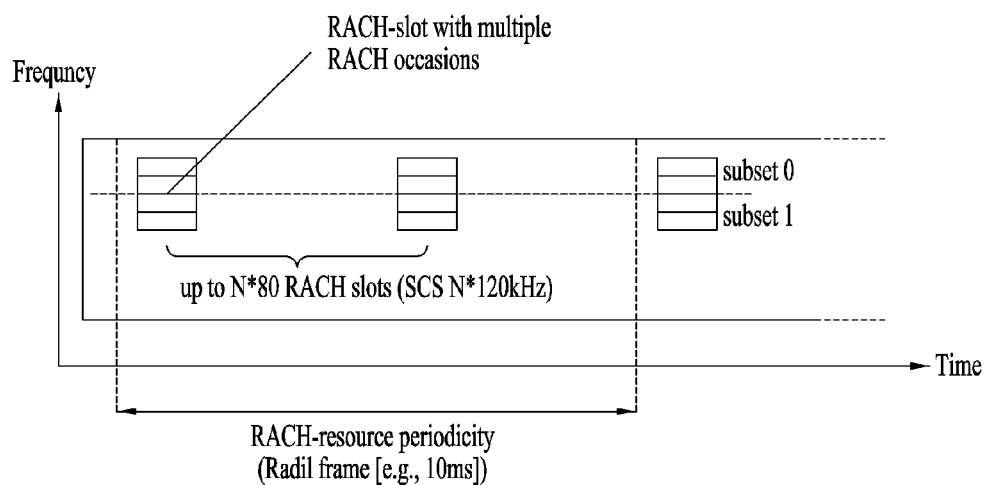

A. For example, referring to FIG. 9, when M=2, subset indexes 0 and 1 may be set as frequency indexes {0,1,2,3} and {4,5,6,7}, respectively. When M=4, subset indexes 0, 1, 2, and 3 may be set as frequency indexes {0,1}, {2,3}, {4,5}, and {6,7}, respectively. In addition, when M=8, subset indexes 0 to 7 may be set as frequency indexes 0 to 7, respectively. In the case of M=8, a frequency index f is not indicated through an RA-RNTI (or MsgB-RNTI).

B. An M value (and a corresponding SF field size) may be set differently according to a size of a PRACH SCS. For example, when a PRACH SCS is 480 (=4*120) KHz, it may be set as M=4 and an SF field size may be 2 bits. For another example, if a PRACH SCS is 960 (=8*120) KHz, it may be set as M=8 and an SF field size may be 3 bits.

C. An M value and a corresponding SP field size may be set differently depending on a presence or non-presence of 2-step RACH process support of a system. For example, in a situation that a (PRACH) SCS is 480 KHz, when a system supports 2-step RACH, it is set as M=4 and an SP field size becomes 2 bits. On the other hand, when there is no 2-step RACH support, it is set as M=2 and an SP field size may become 1 bit. For another example, in a situation that a (PRACH) SCS is 960 KHz, when a system supports 2-step RACH, it is set as M=8 and an SP field size becomes 3 bits. On the other hand, when there is no 2-step RACH support, it is set as M=4 and an SP field size may become 2 bits.

3) Method 1-3: An index of a UL carrier having carried an RO may be indicated through a DCI (field) that schedules an RAR (or MsgB). In this case, a combination of a symbol index s, a slot index t, and a frequency index f of an RO in the corresponding UL carrier may be indicated through an RA-RNTI (or MsgB-RNTI).

4) Method 1-4: While a set of fourteen (OFDM) symbol indexes s is divided into multiple (e.g., L) subsets, a DCI (field) that schedules an RAR (or MsgB) may indicate which subset a location of an RO belongs to. In this case, the combination of a symbol index s, a slot index t, a frequency index f, and a carrier index u of an RO in the subset may be indicated through an RA-RNTI (or MsgB-RNTI).

A. For example, when L=2, subset indexes 0 and 1 may be set as (OFDM) symbol indexes {0, 1, 2, 3, 4, 5, 6} and {7, 8, 9, 10, 11, 12, 13}, respectively. When L=4, subset indexes 0, 1, 2, and 3 may be set as (OFDM) symbol indexes {0,1,2,3}, {4,5,6,7}, {8,9,10,11}, and {12,13}, respectively. When L=7, subset indexes 0, 1, 2, 3, 4, 5, and 6 may be set as (OFDM) symbol indexes {0,1}, {2,3}, {4,5}, {6,7}, {8,9}, {10,11}, and {12,13}, respectively.

5) Method 1-5: An RA-RNTI (or MSgB-RNTI) may be calculated based on a (localized) symbol/slot/frequency/carrier index generated from (localizing) re-indexing all or some of a symbol index s, a slot index t, a frequency index f, and a carrier index u, which are used in an RA-RNTI (or MsgB-RNTI) formula, by targeting a symbol/slot/frequency/carrier index set corresponding to a resource on which an actual RO is configured.

A. For example, a slot index t used in an RA-RNTI (or MsgB-RNTI) may refer to a $(t+1)^{th}$ slot within a set of slots in which an RO is configured, rather than an actual slot index t corresponding to a $(t+1)^{th}$ slot in a 10-ms period.

6) Method 1-6: An RO configuration with respect to 480 KHz or 960 KHz, which is an SCS greater than the existing 120 KHz, may be limited/designed to be configured only for a 480 KHz slot or a 960 KHz slot of up to one of a plurality of 480 KHz or 960 KHz slots belonging to one slot duration based on 120 KHz. In this case, an RA-RNTI (or MsgB-RNTI) formula of the existing Equation 1 may be used identically to determine an RA-RNTI (or MsgB-RNTI) value (without instruction of specific information through separate and additional DCI like Method 1-1/1-2/1-3/1-4), and in case of a (PRACH) SCS of 480 KHz or 960 KHz, Equation 1 may be interpreted differently in accordance with the RO configuration.

A. For example, in case of a (PRACH) SCS of 480 KHz or 960 KHz, a slot index tin the existing RA-RNTI (or MsgB-RNTI) formula may be interpreted as an index of a 120-KHz reference slot including a 480- or 960-KHz slot (index) in which RO is configured.

B. For another example, (equivalently), in case of a (PRACH) SCS of 480 KHz or 960 KHz, a slot index t may be replaced by floor (t_h/s) in the existing RA-RNTI (or MsgB-RNTI) formula if a 480- or 960-KHz reference slot index in which an RO is configured is expressed as t_h. Here, in case of a 480-KHz SCS, it may become s=4. In case of a 960-KHz SCS, it may become s=8.

C. Meanwhile, in a situation operating based on an existing maximum SCS of 120 KHz or a larger SCS (e.g., 480 KHz or 960 KHz), a time gap may be configured between ROs adjacent to each other in time in consideration of a Tx/Rx beam switching operation and/or a Listen-Before-Talk (LBT) operation in a U-band situation. For example, if there is no time gap and a total of N ROs are configured contiguously in time in a specific slot, a total of N ROs may be configured with a time gap over K slots including the specific (reference) slot (thereafter, contiguous in time).

In this case, an RA-RNTI (or MsgB-RNTI) value corresponding to an $n^{th}$ configured RO (in time) among the N ROs in a situation that the time gap is configured may be determined to be the same as an RA-RNTI (or MsgB-RNTI) value for an $n^{th}$ RO in a reference slot on the assumption that there is no configuration of the time gap. For example, an RA-RNTI (or MsgB-RNTI) value corresponding to an $n^{th}$ configured RO (in time) among N ROs may be determined based on Equations 1 and 2 with the combination of a symbol index s and a slot index t corresponding to an $n^{th}$ configured RO (in time) among N ROs in a reference slot on the assumption that total N ROs are configured contiguously in time within a single slot (e.g., a reference slot) according to the existing method. Under such an assumption, a UE may check whether an RO transmitted by the UE matches a received RA-RNTI (or MsgB-RNTI) value.

Alternatively, an RA-RNTI (or MsgB-RNTI) value corresponding to an $n^{th}$ configured RO (in time) among the N ROs in the time gap configured situation may be determined based on Equations 1 and 2 with a symbol index S in which a corresponding RO is actually configured (and a combination of a slot index t corresponding to the reference slot). In this case, the N ROs may have an RA-RNTI (or MsgB-RNTI) value determined based on the same symbol index s and the same slot index t. Accordingly, in order to distinguish a slot position in which the corresponding RO is actually configured, slot position information in which the corresponding RO is actually configured among the K slots may be indicated through a DCI (field) for scheduling an RAR (or MsgB). Under this assumption, the UE may check whether an RO transmitted by the UE matches a received RA-RNTI (or MsgB-RNTI) value and DCI information.

[Proposed Method 2]

1) Method 2-1: If a (PRACH) SCS of a specific value (e.g., A) or more is set, the maximum number of ROs that can be allocated by FDM at the same timing may be limited to a specific value (e.g., B) less than eight. In the following methods, A may be a multiple of 2 as a value greater than 120, and B may be 8/(PRACH SCS/120) as a factor of 8.

A. For example, 480 KHz or 960 KHz (or 240 KHz) may be considered as a value of the A, and four (and/or two) may be considered as a value of the B. Additionally, the larger the value of the A gets, the smaller the value of the B becomes (e.g., B=4 may be considered if A=480 KHz, and B=2 may be considered if A=960 KHz).

B. Accordingly, in the RA-RNTI equation, a range of a frequency index f may have a value of 0 to {B−1}.

2) Method 2-2: When a (PRACH) SCS of a specific value (e.g., A) or more is configured, the number of UL carrier(s) on which an RO may be configured may be limited to 1.

A. For example, a value of the A may be 480 KHz or 960 KHz (or 240 KHz).

B. Accordingly, a carrier index u may be omitted from the RA-RNTI equation.

3) Method 2-3: If a (PRACH) SCS equal to or greater than a specific value (e.g., A) is configured, a maximum RAR window size may be limited to a specific value (e.g., C) less than 10 ms.

A. For example, a value of A may be 480 KHz or 960 KHz (or 240 KHz), and a value of C may be 5 ms (and/or 2.5 ms). Additionally, the larger the value of the A gets, the smaller the value of the C value becomes (e.g., C=5 ms for A=480 KHz, and C=2.5 ms for A=960 KHz).

B. Accordingly, in the RA-RNTI formula (see Equations 1 and 2) (when the total number of slots in a 10-ms period is given as Ns based on a given (PRACH) SCS), the range of the slot index t may be 0 to {(10/C*Ns)−1}.

C. In this case, additionally, the time-axis RO allocation may be configured in units of C periods, and the corresponding RO allocation may be repeatedly configured every C periods.

4) Method 2-4: The maximum supportable/configurable (PRACH) SCS value may be defined/provided differently for each operating frequency band. Accordingly, the range/maximum value of the slot index t may be determined/applied differently for each frequency band in the RA-RNTI formulas of Equations 1 and 2. For example, a range/maximum value of a slot index t may be defined based on a set of slot indexes corresponding to a maximum (PRACH) SCS value defined on a corresponding frequency band.

A. For example, a maximum (PRACH) SCS value that can be supported/configured on a Licensed-band (L-band) and an Unlicensed-band (U-band) may be defined/provided differently. Accordingly, the range/maximum value of the slot index t may be differently determined/applied between the L-band and the U-band in the RA-RNTI formulas of Equations 1 and 2.

5) Method 2-5: The maximum number of (FDMed) ROs that may be configured by FDM at the same timing may be defined/provided differently for each operating frequency band. Accordingly, the range/maximum value of the frequency domain RO index f may be determined/applied differently for each frequency band in the RA-RNTI formulas of Equations 1 and 2. For example, the range/maximum value of the frequency domain RO index f may be determined/applied based on the maximum number of FDMed ROs defined on the corresponding frequency band.

A. For example, the maximum number of FDMed ROs that can be configured in an L-band and a U-band may be differently defined/provided. Accordingly, the range/maximum value of the frequency domain RO index f may be differently determined/applied between the L-band and the U-band in the RA-RNTI formula.

Figure 10:
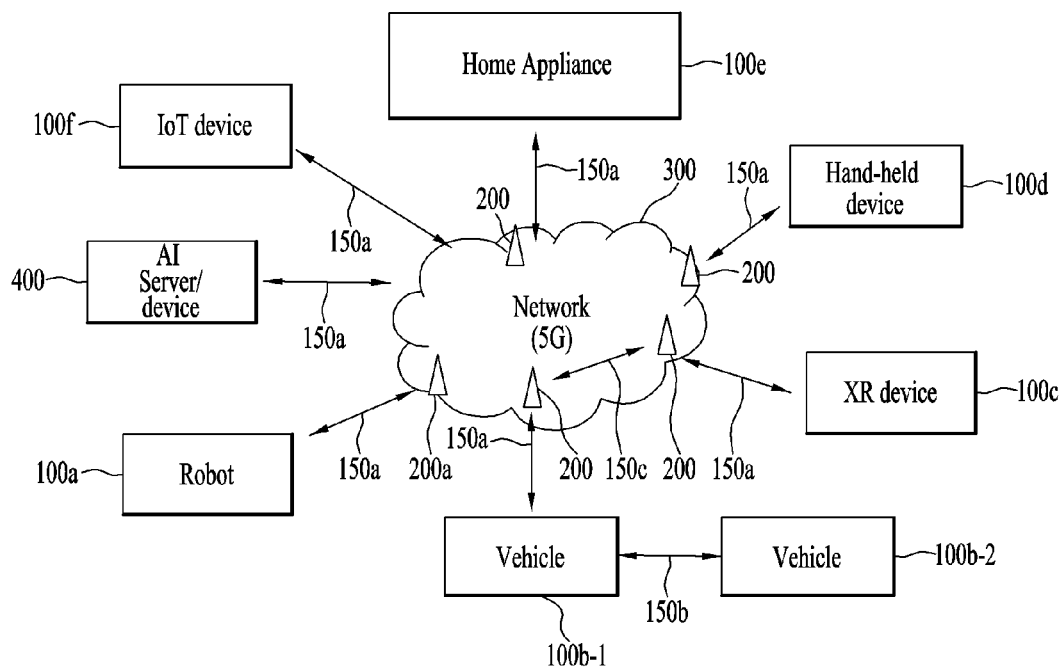
FIGS. 10 to 13 illustrate a communication system 1 and wireless devices applied to the present disclosure

FIG. 10 illustrates a communication system 1 applied to the present disclosure.

Referring to FIG. 10, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 11:
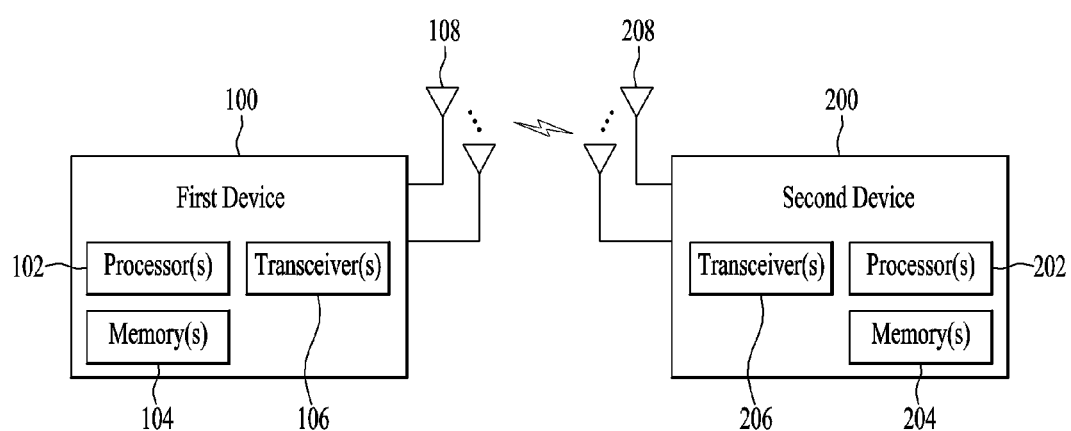

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 12:
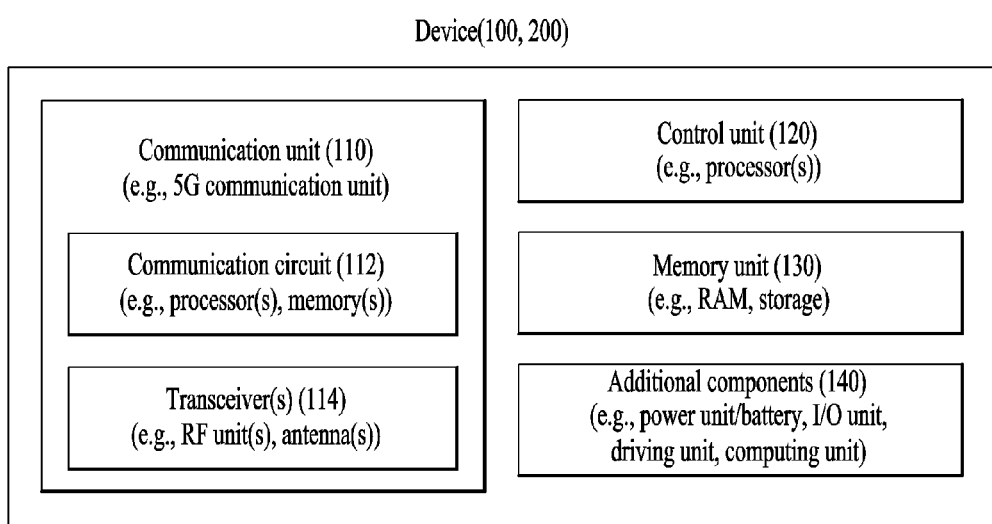

FIG. 12 illustrates another example of a wireless device applied to the present disclosure. The wireless device may be implemented in various forms according to a use-case/service (refer to FIG. 10).

Referring to FIG. 12, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 13:
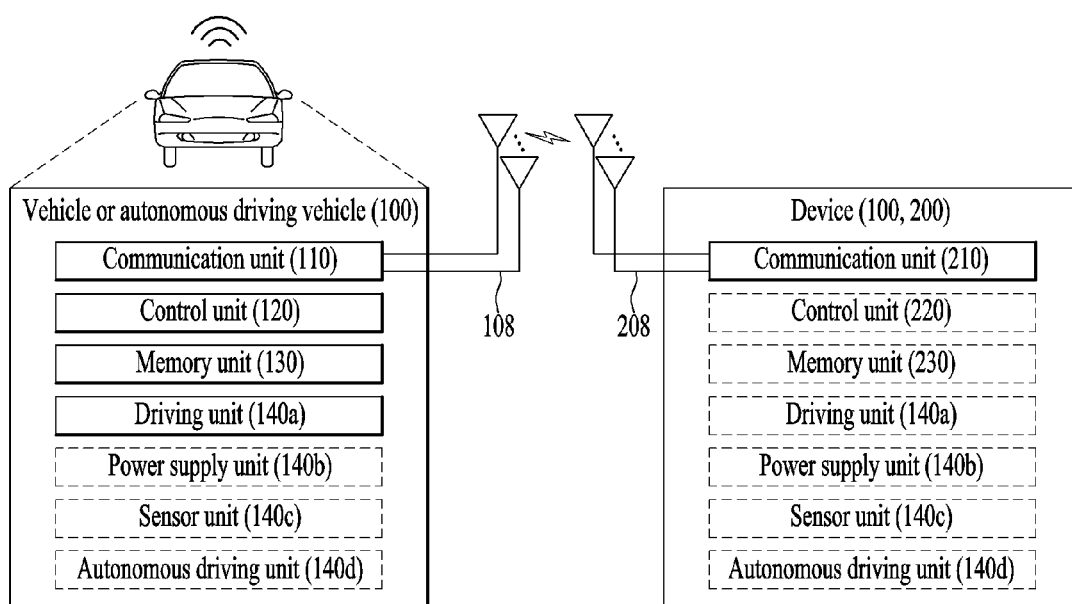

FIG. 13 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

What is claimed is:

1. A method performed by a user equipment (UE) configured to operate in a wireless communication system, the method comprising:
   transmitting a first message comprising a random access (RA) preamble, wherein the RA preamble is transmitted in a random access channel (RACH) occasion among a plurality of RACH occasions;
   monitoring downlink control information (DCI) with a cyclic redundancy check (CRC) scrambled with a radio network temporary identifier (RNTI) related to the RACH occasion; and
   receiving, based on the DCI, a second message comprising a random access response (RAR),
   wherein the RNTI is determined based on a slot index of a slot included in the RACH occasion, and
   wherein, for a first subcarrier spacing (SCS) for the RA preamble being larger than 120 kHz, a second SCS to determine the slot index is identical to 120 KHz.

2. The method of claim 1, wherein for the first SCS being identical to or less than 120 kHz, the second SCS is identical to the first SCS.

3. The method of claim 1, wherein:
   (i) based on the RNTI being a RA-RNTI, the RA-RNTI is determined based on a following first equation:

$1+s+\{14*t\}+\{14*80*f\}+\{14*80*8*u\}$, (ii) based on the RNTI being a message B (MSGB)-RNTI, the MSGB-RNTI is determined based on a following second equation:

$1+s+\{14*t\}+\{14*80*f\}+\{14*80*8*u\}+14*80*8*2$, wherein s is a symbol index identical to or larger than 0 and less than 14,
   wherein t is the slot index identical to or larger than 0 and less than 80,
   wherein f is a frequency index of a frequency resource included in the RACH occasion and identical to or larger than 0 and less than 8, and
   wherein u is 0 or 1 as a value related to a uplink carrier used for the RA preamble.

4. The method of claim 1, wherein the first SCS is identical to one of: 480 kHz or 960 kHz.

5. A user equipment (UE) configured to operate in a wireless communication system, the UE comprising:
   a transceiver; and
   at least one processor coupled with the transceiver and configured to:
     transmit a first message comprising a random access (RA) preamble, wherein the RA preamble is transmitted in a random access channel (RACH) occasion among a plurality of RACH occasions;
     monitor downlink control information (DCI) with a cyclic redundancy check (CRC) scrambled with a radio network temporary identifier (RNTI) related to the RACH occasion; and
     receive, based on the DCI, a second message comprising a random access response (RAR),
   wherein the RNTI is determined based on a slot index of a slot included in the RACH occasion, and
   wherein, for a first subcarrier spacing (SCS) for the RA preamble being larger than 120 kHz, a second SCS to determine the slot index is identical to 120 kHz.

6. The UE of claim 5, wherein for the first SCS being identical to or less than 120 kHz, the second SCS is identical to the first SCS.

7. The UE of claim 5, wherein:
   (i) based on the RNTI being a RA-RNTI, the RA-RNTI is determined based on a following first equation:

$1+s+\{14*t\}+\{14*80*f\}+\{14*80*8*u\}$, (ii) based on the RNTI being a message B (MSGB)-RNTI, the MSGB-RNTI is determined based on a following second equation:

$1+s+\{14*t\}+\{14*80*f\}+\{14*80*8*u\}+14*80*8*2$, wherein s is a symbol index identical to or larger than 0 and less than 14,
   wherein t is the slot index identical to or larger than 0 and less than 80,
   wherein f is a frequency index of a frequency resource included in the RACH occasion and identical to or larger than 0 and less than 8, and
   wherein u is 0 or 1 as a value related to a uplink carrier used for the RA preamble.

8. The UE of claim 5, wherein the first SCS is identical to one of: 480 kHz or 960 kHz.

9. A method performed by a base station (BS) configured to operate in a wireless communication system, the method comprising:
   receiving a first message comprising a random access (RA) preamble, wherein the RA preamble is received in a random access channel (RACH) occasion among a plurality of RACH occasions;
   transmitting downlink control information (DCI) with a cyclic redundancy check (CRC) scrambled with a radio network temporary identifier (RNTI) related to the RACH occasion; and transmitting a second message, related to the DCI, comprising a random access response (RAR), wherein the RNTI is determined based on a slot index of a slot included in the RACH occasion, and wherein, for a first subcarrier spacing (SCS) for the RA preamble being larger than 120 kHz, a second SCS to determine the slot index is identical to 120 kHz.

10. A base station (BS) configured to operate in a wireless communication system, the BS comprising:

a transceiver; and at least one processor coupled with the transceiver and configured to:

receive a first message comprising a random access (RA) preamble, wherein the RA preamble is received in a random access channel (RACH) occasion among a plurality of RACH occasions;

transmit downlink control information (DCI) with a cyclic redundancy check (CRC) scrambled with a radio network temporary identifier (RNTI) related to the RACH occasion; and transmit a second message, related to the DCI, comprising a random access response (RAR), wherein the RNTI is determined based on a slot index of a slot included in the RACH occasion, and wherein, for a first subcarrier spacing (SCS) for the RA preamble being larger than 120 kHz, a second SCS to determine the slot index is identical to 120 kHz.

* * * * *